Dec. 26, 1961
J. J. PROHASKA
3,014,276
SKINNING KNIFE
Filed Nov. 1, 1957
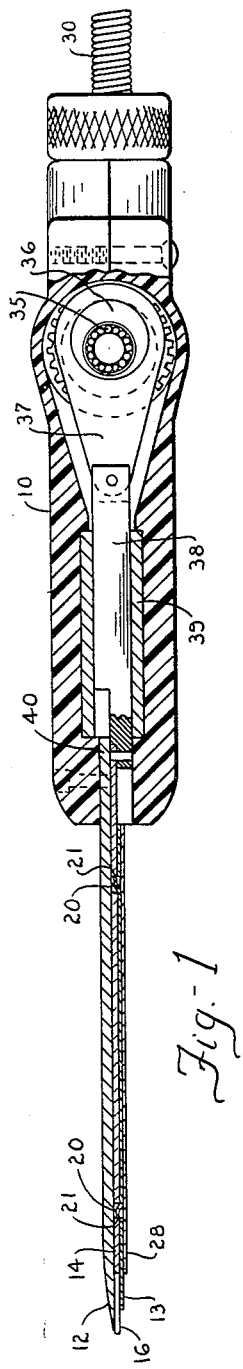
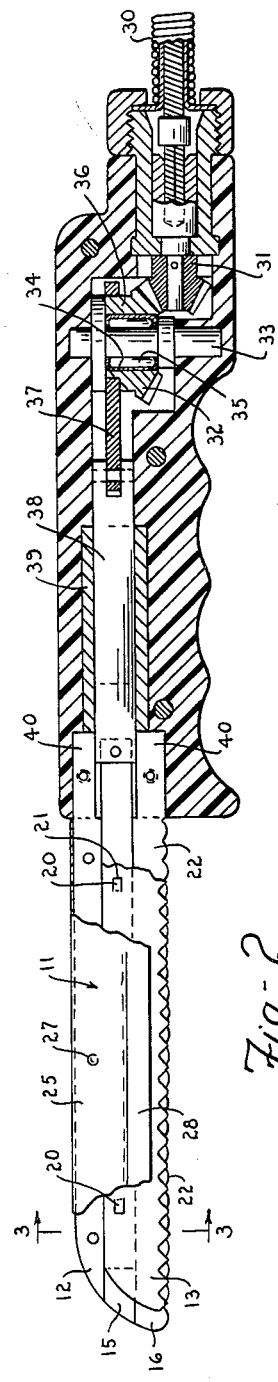
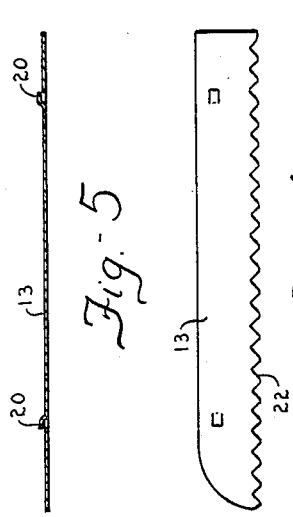
INVENTOR.
JAMES J. PROHASKA
BY
ATTORNEY

United States Patent Office 3,014,276
Patented Dec. 26, 1961

3,014,276
SKINNING KNIFE
James J. Prohaska, 318 S. Edgewood Ave., La Grange, Ill.
Filed Nov. 1, 1957, Ser. No. 693,886
5 Claims. (Cl. 30—272)

This invention relates to a power-driven skinning knife and more particularly to an improved high speed skinning knife drive means and knife blade assembly.

Power-driven skinning knives have been successfully used in the meat-packing industry for many years to speed up the removal of the skin from a carcass with less skilled help and damage to the pelt than when such help uses a simple manually manipulated knife. When the skinning operation is performed in a refrigerated work room after the carcass has been thoroughly chilled, the workers are heavily clothed and may even wear gloves. When the carcasses are skinned on the killing floor the steady flow of carcasses down the line must be maintained. In both cases, a lightweight reliable skinning machine is needed wherein the cutting blade can be quickly renewed. The weight factor is related to fatigue and preferably the knife blade should be of such simple construction that a gloved worker can change the blade without requiring the removal of his gloves.

Various blade arrangements have been proposed for such power-driven skinning knives in the past wherein one or both blades of a pair of cooperating cutting blades are driven. All known structures, however, have been of such design that the movable blades are relatively expensive to manufacture and must be sharpened from time to time. No readily detachable blade mounting devices are used and the known knives must thus be taken out of service to renew the cutting blades.

The present invention provides an improved lightweight high speed drive means for reciprocating one blade of a pair of cooperating cutting blades. The other blade is relatively fixed and forms the bearing support on which the first blade reciprocates. The cooperating blades are both notched along corresponding edges to provide a shearing means for cutting the fibres holding the skin on a carcass. An improved blade mounting means is also provided which makes it possible to renew the cutting blade with a minimum of effort and loss of time. The arrangement herein disclosed is so simple as to make the individual blades so cheap that they may be made disposable and may be discarded after they become dulled during use.

The preferred form of the invention is shown in the drawings wherein:

FIGURE 1 is a top plan view of the knife means partly broken away;

FIGURE 2 is a side elevation partly broken away showing the knife of FIGURE 1;

FIGURE 3 is a view taken on line 3—3 of FIGURE 2;

FIGURE 4 is a side elevation of a disposable knife blade such as may be used with this invention; and FIGURE 5 is a top plan view of the knife blade shown in FIGURE 4.

The knife forming the subject of this invention has a grip sized handle 10 with suitable finger holds and an extending knife means 11. The knife includes an elongated relatively stiff self-sustaining fixed blade 12 carried on the handle 10 and a cooperating elongated thin reciprocating relatively flexible blade 13. The reciprocating blade is driven from the reciprocably driven shaft 14 that is slidably carried in a longitudinally disposed bearing track 15 provided in fixed blade 12. The drive shaft 14 or driver is driven by motion-converting means carried in handle 10 as will be described more fully below.

The driver 14 is guided by its contact in bearing track 15 and has one side flush with a bearing surface 16 that extends from one longitudinal edge of the fixed blade 12 to the bearing track 15. A planar bearing surface 16 is adapted to support one side of the blade and guide the reciprocating blade 13 as it is driven back and forth by driver 14, as will appear more fully below.

Referring to FIGURES 4 and 5, it is seen that blade 13 may be provided with the pressed out tangs 20 which may be produced to have a very close tolerance in a lengthwise direction as well as in the direction of the width of the blade by being ground to dimension after being struck out of the metal during a punching process. The tangs are adapted to fit into and closely cooperate with precision formed seats 21 in driver 14 so that the reciprocating driver 14 can deliver its motion to the blade. As shown the tangs 20 are faced in opposite directions so that a positive drive may be produced in each direction.

The exposed longitudinal edges of the blades are notched as at 22 to provide shearing edges for severing the fibres holding the skin to a carcass. Very good results are obtained when the faces of the notches are disposed at right angles to the cooperating rubbing surfaces of the reciprocating and stationary blades. With such a construction, the reciprocating blades can be punched out of a sheet of metal at a rapid rate and no additional sharpening step need be performed. By eliminating the necessity for sharpening new blades, coupled with the punched out tang structure 20 for mounting the blade 13 on the driver, it is seen that a very inexpensive disposable blade structure is here disclosed.

The blade 13 is held firmly but slidably against the cooperating bearing surface 16 by a spring cap 25 that is adapted to be resiliently locked onto the fixed blade 12. The spring cap has a generally hook-shaped mounting section that embraces the non-cutting longitudinal edge of the fixed blade and has a rolled edge 26 which engages in a suitable slot in the fixed blade to hold the spring cover on the blade. Also the dimples 27 may be provided which cooperate with suitable locating apertures on the opposite wall of the fixed blade. The spring cover has a downwardly extending skirt 28 that is resiliently urged against the side of the reciprocating blade 13 to hold the blade in planar sliding contact with the bearing surface 16.

The cover 25 is resiliently carried on the fixed blade 12 but may be quickly removed from its position on blade 12 by a simple manual manipulation. When the cover is removed blade 13 may be easily removed and a new blade placed in position on bearing 16 with tangs 20 engaged in seats 21 of driver 14. The cover may then be quickly and easily snapped into place to hold blade 13 slidably in place and this knife is conditioned for operation again. Thus, a blade replacement can be quickly and easily accomplished manually without the necessity of using any tools. Blade change can even be performed in a refrigerated room without requiring the workman to remove his gloves.

The preferred form of a mechanism for converting rotary motion to reciprocating motion to drive the driver 14 is shown housed in the handle 10. The rotary motion is delivered to the handle from any suitable source such as by a flexible shaft 30 which drives a bevel gear 31 rotatably carried inside the handle. Bevel gear 31 meshes with and drives bevel gear 32 disposed at a right angle with respect to gear 31. A fixed shaft 33 fixedly supported in the handle provides an axle for gear 32 and that gear has a bore 34 larger than the periphery of shaft 33 for receiving needle bearings 35 between the gear and shaft.

The gear 32 has a cylindrical hub 36 integral therewith, the hub being eccentric with respect to the axis of rotation for the gear. The hub is adapted to receive one end of a connecting rod 37 which is connected at its other end to the reciprocating slider 38 that drives the reciprocating driver 14. Suitable guide bearing means 39 is provided in the handle 10 for carrying the slider 38. One end of bearing 39 is adapted to be engaged by the inner end portions 40 integral with the fixed blade 12 of the knife means as best shown in FIGURE 2, and suitable bolt means may be provided to hold the fixed blade assembled on the handle 10.

As is apparent from the description above, when the flexible shaft 30 is driven, gear 31 rotates gear 32. The eccentric hub 36 drives connecting rod 37 to reciprocate slider 38 which drives shaft 14. The knife blade 13 carried by the drive shaft is thus reciprocated relative to the fixed blade 12 and the notched edges coact whereby a skin can be easily separated from a carcass when the knife is properly manipulated.

Because of the integral eccentric hub and gear assembly included in the drive line here shown, it is possible to support gear 36 with a single precision bearing installation and the bearing includes the elongated needle bearings 35 positioned directly in line with the thrust loads. It is also to be noted that the integral gear and cam hub arrangement mounted directly on needle bearings 35 minimizes the weight of the rotating forces which is desirable in a high speed mechanism. This design also is more compact in that the bearings are fitted into the space necessarily provided for the gear 32 and cam 36 and the completed structure is of lighter weight than any known devices of this kind.

While the above description covers the preferred form of the skinning knife forming the subject of this invention, it is apparent that many modifications thereof may occur to those skilled in the art which will fall within the scope of the following claims.

I claim:
1. A power-driven skinning knife comprising an elongated grip sized casing, a flexible drive connected to one end of said casing, a fixed elongated knife blade and a cooperating somewhat flexible and lightweight reciprocating blade extending outwardly from the other end of said casing, motion-converting means in said casing connected to said flexible drive for converting rotary to reciprocating motion, an elongated reciprocating driver connected to said motion-converting means in said casing and extending outwardly therefrom, said fixed blade having a bearing surface on one side thereof and an elongated bearing track therein for supporting said reciprocating driver in flush relation to said side bearing, and manually removable resilient means supported on the fixed blade and extending lengthwise of the reciprocating blade along substantially the entire length thereof for supporting said reciprocating knife blade on said side bearing and driver.

2. A power-driven skinning knife comprising an elongated grip sized casing, a flexible drive connected to one end of said casing, a fixed elongated knife blade having a flat bearing surface thereon and a cooperating thin reciprocating blade extending outwardly from the other end of said casing, said thin blade having sliding contact with said flat bearing surface, motion-converting means in said casing connected to said flexible drive for converting rotary to reciprocating motion, an elongated reciprocating driver connected to said motion-converting means in said casing and extending outwardly therefrom, an elongated bearing track in said fixed blade for supporting said reciprocating driver, one side of the driver that is carried in the bearing track being flush with said flat bearing, and means including a manually removable spring cover means supported on said fixed blade and extending lengthwise of the reciprocating blade along substantially the entire length thereof for supporting said reciprocating knife blade on said driver and pressing it against the flat bearing surface on said fixed blade.

3. A power-driven skinning knife comprising a relatively fixed elongated blade and a thin somewhat flexible elongated reciprocating blade, both of said blades having cooperating notched edges for performing a severing action, said fixed blade having a bearing channel extending lengthwise thereof, an elongated reciprocating driver supported in said bearing channel, said fixed blade having a bearing face extending from the notched edge of said blade to said channel for supporting said reciprocating blade, said reciprocating blade being carried on said bearing face and being drivingly connected to said driver so that said notched edges overlay each other, and a removable spring cap supported on said fixed blade for biasing said reciprocating blade against said driver and bearing surface.

4. A power-driven skinning knife comprising a relatively fixed elongated blade and an elongated reciprocating blade, said fixed blade being relatively stiff and self-sustaining, said reciprocating blade being relatively thin and flexible, both of said blades having cooperating notched edges for performing a severing action, said fixed blade having a bearing channel extending lengthwise thereof, an elongated reciprocating driver supported in said bearing channel, said fixed blade having a bearing face extending from the notched edge of said blade to said channel for supporting said reciprocating blade, said reciprocating blade being relatively fixedly connected in driving relation to said driver so that said notched edges overlay each other, and a removable spring cap supported on said fixed blade for biasing said relatively flexible reciprocating blade against said drive shaft and bearing surface on the self-sustaining fixed blade.

5. A power-driven skinning knife comprising a relatively fixed elongated blade and an elongated somewhat flexible reciprocating blade, both of said blades having cooperating notched edges for performing a severing action, said fixed blade having a bearing channel extending lengthwise thereof, an elongated reciprocating driver supported in said bearing channel, said driver having seat means thereon, said fixed blade having a bearing face extending from the notched edge of said blade to said channel for supporting said reciprocating blade, said reciprocating blade having tangs integral therewith for engaging with said seat means of said driver so that said notched edges of said blades overlay each other, and an elongated removable spring cap having one edge resiliently locked on and supported on said fixed blade and the other edge engaging the reciprocating blade for biasing said reciprocating blade against said driver and bearing surface.

References Cited in the file of this patent

UNITED STATES PATENTS

| | | |
|---|---|---|
| 1,089,727 | Sharpnack | Mar. 10, 1914 |
| 1,326,166 | Backus | Dec. 30, 1919 |
| 1,400,379 | Schollmeyer | Dec. 13, 1921 |
| 1,878,549 | Sireci | Sept. 20, 1932 |
| 2,040,683 | Biniek | May 12, 1936 |
| 2,168,703 | Dziedzic et al. | Aug. 8, 1939 |
| 2,180,244 | Kosterman | Nov. 14, 1939 |
| 2,274,448 | Hoover | Feb. 24, 1942 |
| 2,301,147 | Schaaf et al. | Nov. 3, 1942 |
| 2,567,798 | Bamberger | Sept. 11, 1951 |
| 2,596,078 | Prohaska | May 6, 1952 |
| 2,781,578 | Guilfoyle | Feb. 19, 1957 |

FOREIGN PATENTS

| | | |
|---|---|---|
| 520,011 | Great Britain | Apr. 11, 1940 |
| 621,172 | Great Britain | Apr. 5, 1949 |